Dec. 1, 1959   R. C. ZELLER   2,915,344
SEALING MEANS FOR TRUNNION BEARINGS
Filed Nov. 7, 1955

INVENTOR.
ROBERT C. ZELLER
BY
ATTORNEYS

United States Patent Office 2,915,344
Patented Dec. 1, 1959

2,915,344

SEALING MEANS FOR TRUNNION BEARINGS

Robert C. Zeller, Defiance, Ohio, assignor to The Zeller Corporation, Defiance, Ohio, a corporation of Ohio Application November 7, 1955, Serial No. 545,473

1 Claim. (Cl. 308—187.1)

The invention relates to sealing means for trunnion bearings and forms a continuation-in-part of my former application for patent, Serial No. 534,928, filed September 19, 1955, now abandoned.

It is the object of the invention to obtain a construction in which the sealing means is itself enclosed and protected by the bearing while performing its function of excluding entrance of dust or grit and retaining the lubricant within the bearing.

Figure 1:
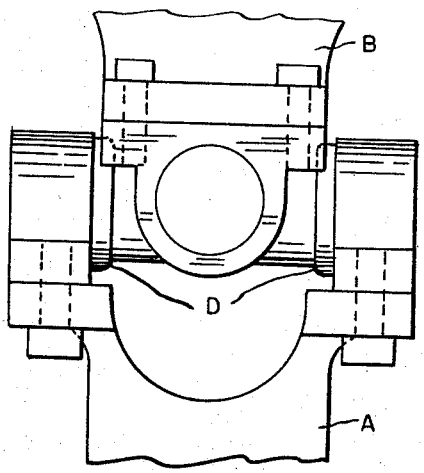
Fig. 1 is a side elevation of a universal joint of the trunnion type.
Figure 2:
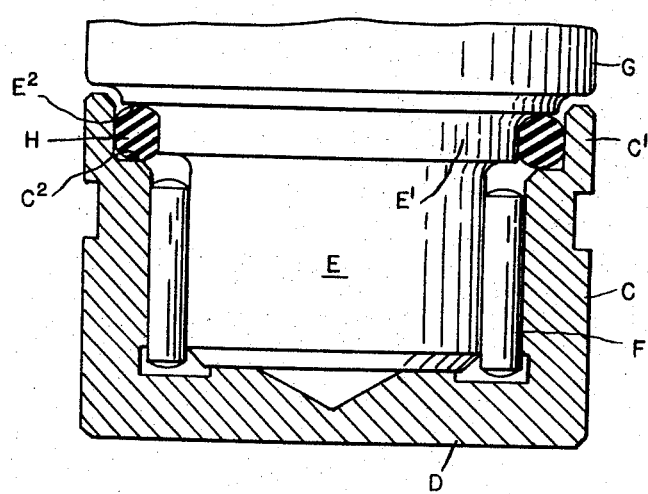
Fig. 2 is a central section through one of the trunnion bearings with the sealing means applied thereto.

Fig. 1 illustrates a universal joint of the type comprising the shaft members A and B, each bifurcated to form opposite trunnion bearings in the furcations thereof. Each of these bearings C has a closed outer end D and is adapted to receive a trunnion E and a needle or other anti-friction bearing F surrounding the same. The trunnion E projects radially outward from a cross member G in planes which are at right angles to each other. The sealing means is applied to each trunnion bearing in an inward extension thereof beyond the radial thrust receiving portion. It comprises an annular portion $C'$ on the bearing and a portion $E'$ on the trunnion, said portions being radially offset from the thrust bearing portion and the sealing ring H is placed between these portions. As specifically shown and described in my former application, this sealing ring in cross section has a T-shaped head portion which extends inwardly beyond the bearing and is exposed. In my improved construction forming the subject matter of this application the sealing ring is substantially enclosed by the bearing to be protected thereby. Also the construction is simplified. As shown in Fig. 2, the portion $E'$ on the trunnion has adjacent thereto a shoulder $E^2$ which is spaced from and opposite a shoulder $C^2$ on the bearing C. The portion $C'$ of the bearing extends slightly beyond the shoulder $E^2$ with only working clearance therebetween. Thus, there is formed a substantially closed annular space between the concentric portions $E'$ and $C'$ and the shoulders $E^2$ and $C^2$. The sealing ring H is preferably one of the so-called O-ring type. This is normally circular in cross section, the diameter of which is somewhat greater than the space between the concentric portions $E'$, $C'$ and the shoulders $E^2$, $C^2$. Consequently when this ring is placed within the annular space it is deformed to have effective sealing contact with each of these surfaces. Also, the portion $C'$ of the bearing conceals and protects the ring, there being only the slight working clearance between this portion $C'$ and the shoulder $E^2$. It is obvious that the ring so positioned will exclude entrance of foreign matter into the working portions of the bearing and will also retain the lubricant therein.

What I claim as my invention is:

A trunnion, a bearing therefor closed at its outer end and having a cylindrical inner surface, antifriction rollers between said trunnion and said cylindrical surface, the open end of said bearing having an integral portion extending axially beyond said rollers forming an inner cylindrical surface of greater diameter than said roller-engaging surface and also forming an adjacent annular shoulder, said trunnion having an enlarged portion beyond said rollers forming an outer cylindrical surface opposite said integral portion of diameter approximating the diameter of the roller-engaging surface of said bearing, said trunnion having an adjacent annular shoulder opposite said bearing shoulder and within the cylindrical surface of said integral portion, said shoulders and said cylindrical surfaces forming a substantially closed annular channel rectangular in cross section, and a resilient sealing ring of the O-ring type within said channel, the undeformed circular periphery of the cross section of said O-ring being greater in diameter than the space between said end shoulders but being of an area less than that of said channel.

References Cited in the file of this patent

UNITED STATES PATENTS

| | | |
|---|---|---|
| 2,244,379 | Warner | June 3, 1941 |
| 2,285,623 | Swenson et al. | June 9, 1942 |
| 2,285,870 | Parker | June 9, 1942 |
| 2,433,732 | Brown | Dec. 30, 1947 |
| 2,614,895 | Erwin | Oct. 21, 1952 |
| 2,645,507 | Isenbarger | July 14, 1953 |